US011284129B2

United States Patent
Lee et al.

(10) Patent No.: US 11,284,129 B2
(45) Date of Patent: Mar. 22, 2022

(54) SYSTEM FOR PROVIDING PERSONALIZED ADVERTISEMENTS BASED ON CURRENT NEEDS OF USER

(71) Applicants: Shou-Pon Lee, New Taipei (TW); Kuang-Yao Lee, Richardson, TX (US)

(72) Inventors: Shou-Pon Lee, New Taipei (TW); Kuang-Yao Lee, Richardson, TX (US)

( * ) Notice: Subject to any disclaimer, the term of this patent is extended or adjusted under 35 U.S.C. 154(b) by 0 days.

(21) Appl. No.: 16/891,111

(22) Filed: Jun. 3, 2020

(65) Prior Publication Data

US 2021/0204006 A1 Jul. 1, 2021

(30) Foreign Application Priority Data

Dec. 31, 2019 (TW) .................................. 108148685

(51) Int. Cl.
*H04N 21/234* (2011.01)
*G06Q 30/02* (2012.01)
*H04N 21/262* (2011.01)

(52) U.S. Cl.
CPC ... *H04N 21/23424* (2013.01); *G06Q 30/0258* (2013.01); *G06Q 30/0271* (2013.01); *H04N 21/26241* (2013.01)

(58) Field of Classification Search
None
See application file for complete search history.

(56) References Cited

U.S. PATENT DOCUMENTS

| 10,897,652 | B1* | 1/2021 | Atkins | H04N 21/2146 |
| 2006/0116928 | A1* | 6/2006 | Onozato | G06Q 30/0258 |
| | | | | 705/14.56 |
| 2006/0282316 | A1* | 12/2006 | Snyder | G06Q 30/0267 |
| | | | | 705/14.64 |
| 2007/0239721 | A1* | 10/2007 | Ullman | G06Q 30/00 |
| 2009/0210902 | A1* | 8/2009 | Slaney | H04N 21/44222 |
| | | | | 725/34 |
| 2010/0030639 | A1* | 2/2010 | Feng | G06Q 30/0267 |
| | | | | 705/14.43 |
| 2011/0016014 | A1* | 1/2011 | Tonnison | G06Q 30/0253 |
| | | | | 705/26.2 |

(Continued)

FOREIGN PATENT DOCUMENTS

CN 103780929 A 5/2014

*Primary Examiner* — Ricky Chin
(74) *Attorney, Agent, or Firm* — Bacon & Thomas, PLLC

(57) ABSTRACT

A system for providing personalized advertisements based on current needs of user includes a media system, an advertisement system, and multiple user end devices. The media system provides a playing schedule for programs of digital media. The advertisement system provides various advertisements. The user end devices are connected to the media system and the advertisement system via packet transmission. A specific user end device submits an advertisement request to the media system to configure the type of interested advertisements. The media system matches the type of interested advertisement with the variety of advertisements provided in the advertisement system, so as to find a matched advertisement conforming to the type of interested advertisements and select an advertisement version therefrom. The selected advertisement versions are combined for being played when the media system plays a corresponding program on the specific user end device.

12 Claims, 7 Drawing Sheets

(56) References Cited

U.S. PATENT DOCUMENTS

| | | | | |
|---|---|---|---|---|
| 2011/0071902 A1* | 3/2011 | Tan | .................... | G06Q 30/0251 |
| | | | | 705/14.49 |
| 2011/0247027 A1* | 10/2011 | Davis | ............... | H04N 21/26613 |
| | | | | 725/5 |
| 2012/0197897 A1* | 8/2012 | Knight | ............ | H04N 21/44222 |
| | | | | 707/740 |
| 2013/0144720 A1* | 6/2013 | Hari | .................. | G06Q 30/0241 |
| | | | | 705/14.55 |
| 2013/0185450 A1* | 7/2013 | Rosenfeld | .......... | H04N 21/4345 |
| | | | | 709/231 |
| 2013/0263178 A1* | 10/2013 | Dow | ................ | H04N 21/25866 |
| | | | | 725/32 |
| 2014/0020017 A1* | 1/2014 | Stern | ................. | H04N 21/2747 |
| | | | | 725/34 |
| 2015/0143069 A1* | 5/2015 | Elsloo | ................. | H04N 21/231 |
| | | | | 711/167 |
| 2017/0220216 A1* | 8/2017 | Thompson | .............. | G06T 13/80 |
| 2017/0228762 A1* | 8/2017 | Riviello | ............ | G06Q 30/0277 |
| 2017/0264934 A1* | 9/2017 | Guo | .................. | H04N 21/8547 |
| 2018/0365730 A1* | 12/2018 | Sherwin | ............ | G06Q 30/0255 |
| 2019/0222906 A1* | 7/2019 | Barbour | ................... | H04N 5/76 |
| 2020/0336230 A1* | 10/2020 | Henderson | ............ | H04H 60/06 |
| 2021/0204006 A1* | 7/2021 | Lee | .................... | H04N 21/2668 |

\* cited by examiner

SYSTEM FOR PROVIDING PERSONALIZED ADVERTISEMENTS BASED ON CURRENT NEEDS OF USER

BACKGROUND

1. Field of the Invention

The present invention relates to the technical field of advertisement provision and, more particularly, to a system for providing personalized advertisements based on the current needs of user.

2. Description of Related Art

Typically, with the existing advertisement method using electronic media such as TV, Internet audio and video, radio broadcasting, etc., the advertisements are mostly played through public broadcasting before or during the broadcasting of the TV program, Internet audio and video program or radio program, so as to directly play advertisements of specific manufacturers or specific products.

However, in the aforementioned prior advertisement playing method, since the user cannot select the type of advertisements, the user is usually not interested in the content of the advertisement being played, and even feels disgusted, resulting in greatly reducing the effect of the advertisement.

In view of this, the present invention provides a system for playing personalized advertisements based on current needs of user to effectively solve the shortcomings of the prior advertisement playing.

SUMMARY

The object of the present invention is to provide a system for providing personalized advertisements based on current needs of user, with which the advertisements that a user is interested in are combined to be played or displayed when the user watches or listens to a program or watches a static media content, thereby greatly improving the effect of the advertisement.

In one aspect of the present invention, there is provided a system for providing personalized advertisements based on current needs of user, which includes: a media system for providing a playing schedule for programs of digital media, each program having at least one advertisement period; an advertisement system coupled to the media system for providing a variety of advertisements, each advertisement including a plurality of advertisement versions with different lengths of time; and a plurality of user end devices connected to the media system and the advertisement system via packet transmission, each client device having a unique identification code with which the media system and the advertisement system identify a specific user end device, wherein a specific user end device submits an advertisement request to the media system to configure at least one type of interested advertisements of the specific user end device, and the media system matches the at least one type of interested advertisements of the specific user end device with the variety of advertisements provided in the advertisement system, so as to find at least one matched advertisement that conforms to the type of interested advertisements of the specific user end device and select at least one advertisement version from the at least one matched advertisement, and combine the advertisement versions selected from all the matched advertisements, whereby, when the media system plays a program on the specific user end device, the combined advertisement versions selected from all the matched advertisements are played during at least one advertisement period of the program.

In another aspect of the present invention, there is provided a system for providing personalized advertisements based on current needs of users, which includes: a media system for providing an issuing list for static media contents of digital media, each static media content having at least one advertisement space; an advertisement system coupled to the media system for providing a variety of advertisements, each advertisement including a plurality of advertisement versions with different sizes; and a plurality of user end devices connected to the media system and the advertisement system via packet transmission, each client device having a unique identification code with which the media system and the advertisement system identify a specific user end device, wherein, a specific client device submits an advertisement request to the media system to configure at least one type of interested advertisements of the specific user end device, and the media system matches the at least one type of interested advertisements of the specific user end device with the variety of advertisements provided in the advertisement system, so as to find at least one matched advertisement that conforms to the type of interested advertisements of the specific user end device and select at least one advertisement version from the at least one matched advertisement, and combine the advertisement versions selected from all the matched advertisements, whereby, when the media system issues the static media content to the specific user end device, the combined advertisement versions selected from all the matched advertisements are arranged in the at least one advertisement space of the static media content.

Other objects, advantages, and novel features of the disclosure will become more apparent from the following detailed description when taken in conjunction with the accompanying drawings.

DETAILED DESCRIPTION

The following embodiments when read with the accompanying drawings are made to clearly exhibit the aforementioned and other technical contents, features and/or effects of the present invention. Through the exposition by means of the specific embodiments, people would further understand the technical means and effects that the present invention adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Figure 1:
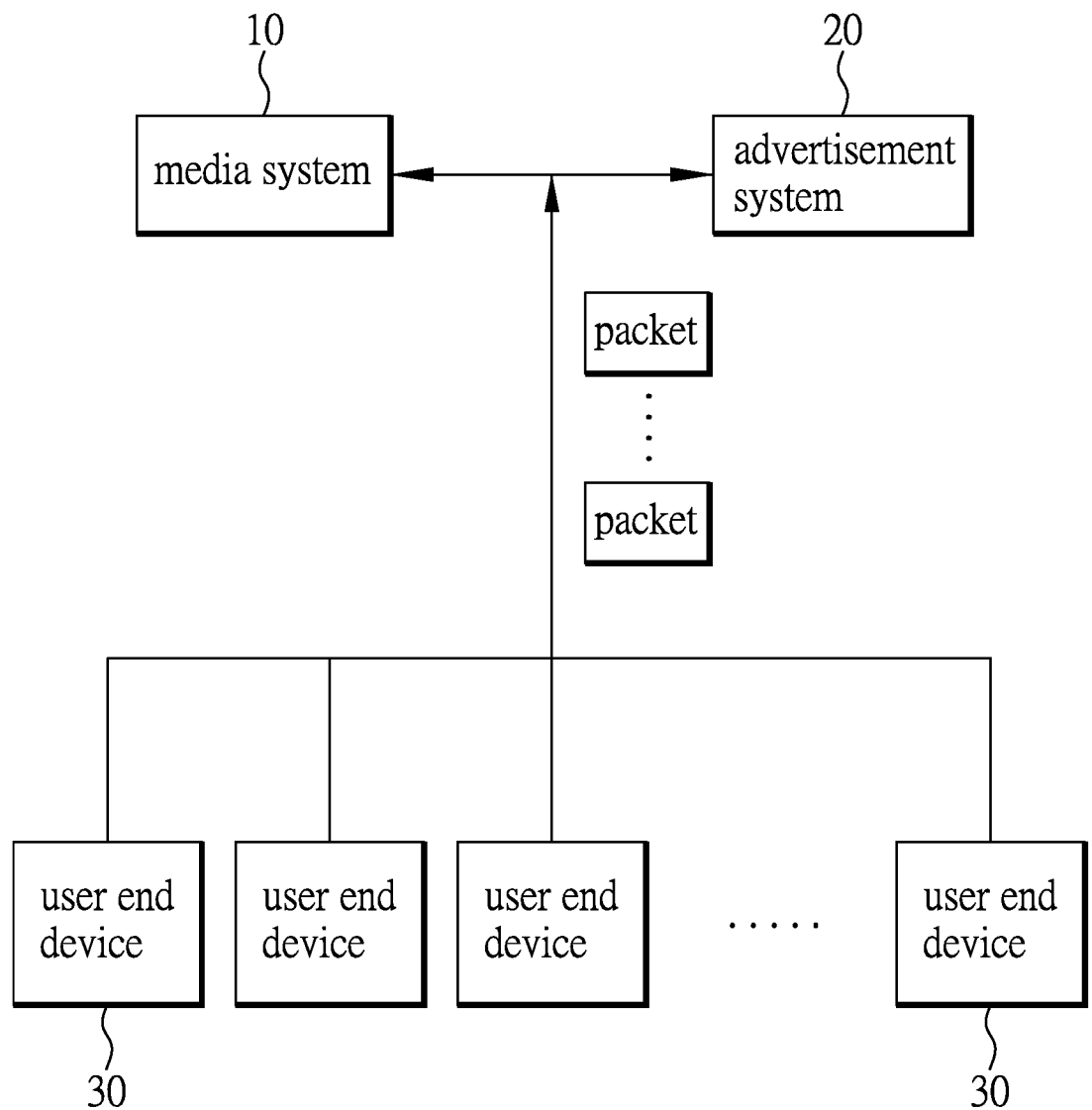
FIG. 1 is a schematic diagram of the system for providing personalized advertisements based on current needs of user according to the present invention.

FIG. 1 shows the system for providing personalized advertisements based on current needs of user according to the present invention, which includes a media system 10, an advertisement system 20 and a plurality of user end devices 30. The media system 10 and the advertisement system 20 are coupled to each other and are connected to the plurality of user end devices 30 in a packet transmission manner through transmission media such as the Internet, cable networks or wireless digital TV networks, based on which digital media programs or content and advertisements are played or displayed on the user end devices 30.

The aforementioned user end device 30 may be an electronic device with a signal transmission function such as a TV, a computer, a mobile phone, etc., and each user end device 30 has a unique identification code such as an identity code or a network address. Therefore, the media system 10 and the advertisement system 20 can identify a specific user end device 30 so as to provide programs or media content and advertisements to the specific user device 30. The media system 10 provides the playing of programs of digital media such as TVs, radios and so on, or the displaying of static media content of digital media such as digital newspapers, magazines and so on. The advertisement system 20 can provide the production of various advertisements. As a result, according to the needs of a specific user end device 30, the media system 10 and the advertisement system 20 can provide the programs or static media content that a specific user want to watch or listen to and the advertisements that the specific user is interested in for being played or displayed on the specific user end device 30, so as to satisfy the needs of the specific user in watching or listening to programs or static media content thereby effectively enhancing the effectiveness of advertisement.

Figure 2:
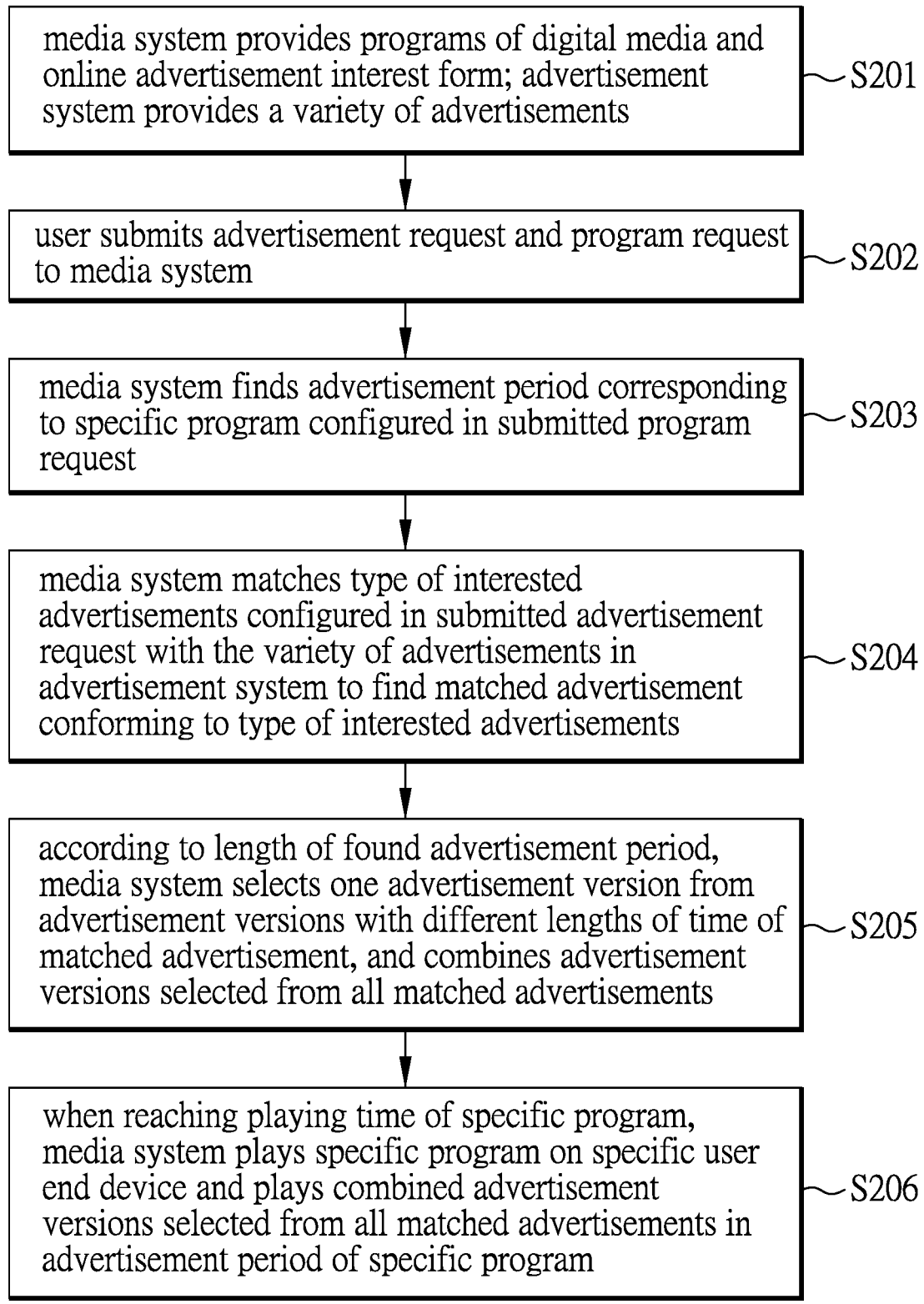
FIG. 2 shows an operation flow of the system for providing personalized advertisements based on current needs of user according to the present invention.

FIG. 2 shows an operation flow of the system for playing personalized advertisements based on current needs of user according to the present invention, which is suitable for the use environment of playing audio or video programs and advertisements of TVs or radios. First, in step S201, the media system 10 provides a playing schedule for programs of various digital media, and each program has at least one advertisement period. The advertisement period has a length of N time units, where N is an integer greater than 0 and one time unit is, for example, 5 seconds. The media system 10 further provides an online advertisement interest form for allowing the user end device 30 to submit an advertisement request. The advertisement system 20 provides a variety of advertisements, and each advertisement includes a plurality of advertisement versions with different lengths of time.

Then, in step S202, the user uses his/her user end device 30 to submit an advertisement request to the media system 10 by filling out an online advertisement interest form, so as to configure at least one type of interested advertisements that the user is currently interested in. According to the playing schedule of various digital media programs provided by the media system 10, the user may use his/her user end device 30 to submit a program request to the media system 10 so as to configure at least one specific program that the user wants to watch or listen to.

Next, in step S203, according to at least one specific program configured in the program request submitted by the specific user end device 30, the media system 10 finds at least one advertisement period corresponding to the specific program, and the at least one advertisement period is the time inserted in the playing of the specific program for playing advertisement.

Next, in step S204, the media system 10 matches the at least one type of interested advertisements configured in the advertisement request submitted by the specific user end device 30 with the variety of advertisements provided in the advertisement system 20, so as to find at least one matched advertisement that conforms to the type of interested advertisements.

Next, in step S205, according to the length of the at least one advertisement period found in step S203, the media system 10 selects at least one advertisement version from the advertisement versions with different lengths of time of the at least one matched advertisement found in step S204, and combines the advertisement versions selected from all the matched advertisements, wherein the playing time for the combined advertisement versions selected from all the matched advertisements is equal to the length of the aforementioned advertisement period.

Finally, in step S206, when reaching the playing time of the at least one specific program, the media system 10 plays the specific program on the specific user end device 30, and plays the combined advertisement versions selected from all the matched advertisements in the advertisement period of the specific program.

Figure 3:
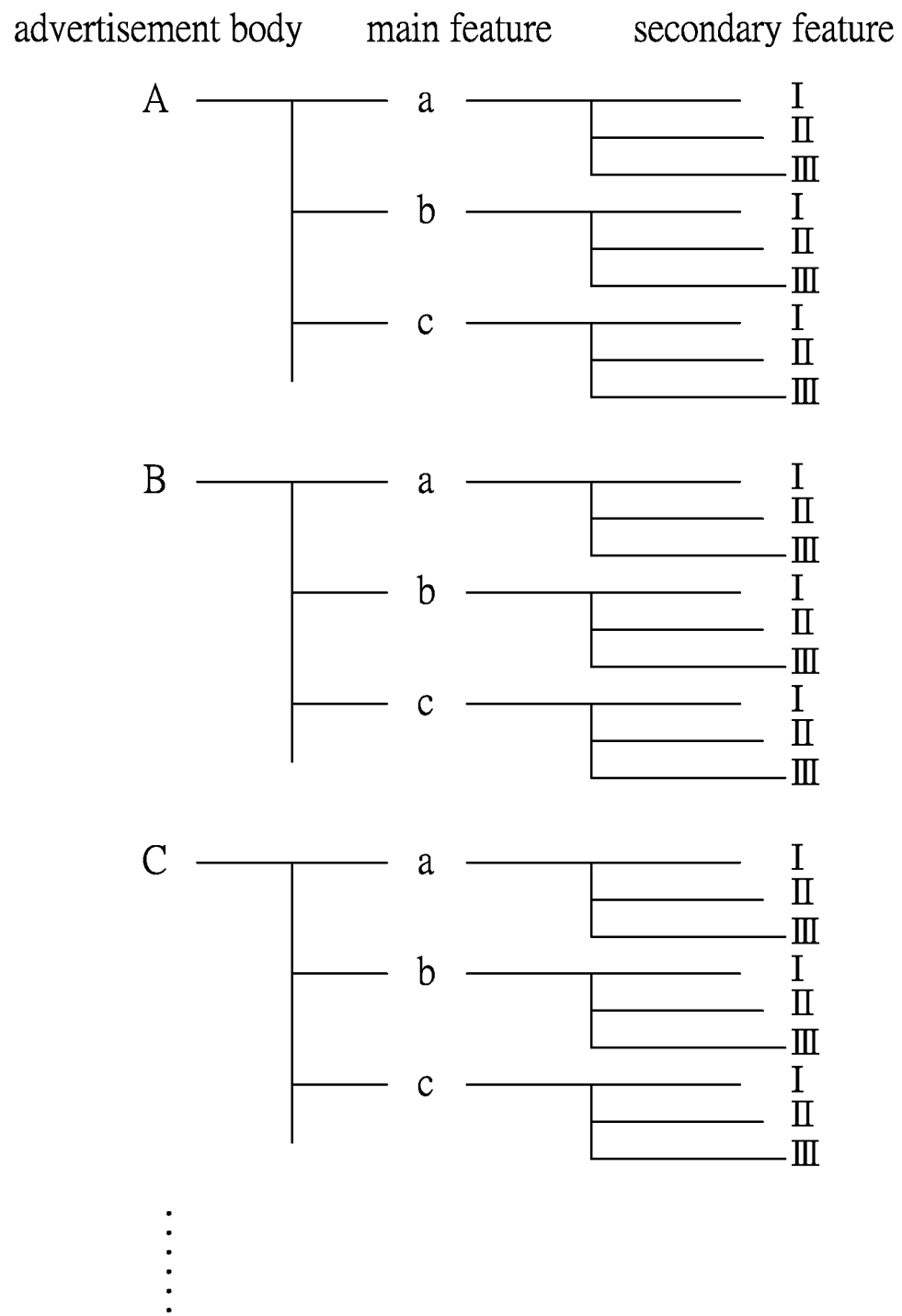
FIG. 3 schematically illustrates an online advertisement interest form provided by the media system of the present invention.

Further, in step S201, the online advertisement interest form provided by the media system 10 according to an embodiment of the present invention is a form with a multi-level menu. As shown in FIG. 3, the first level of the online advertisement interest form is provided with multiple options of advertisement body (A, B, C . . . ). Under each option of the advertisement body, the second level is provided with multiple options of main feature (a, b, c . . . ). Under each option of the main feature, the third level is provided with multiple options of secondary feature (I, II, III . . . ). However, it is noted that, without being limited to the three-level menu, the form may be provided with a menu of two levels or more than three levels based on the actual needs. With this multi-level menu form, the user is able to quickly configure the type of interested advertisements that user is currently interested in through making selections.

For example, the aforementioned advertisement body may be a product category, and the multiple options of the product category may be food (A), transportation (B), travel (C), etc. The multiple options of the main feature of food (A) may be milk powder (a), coffee (b), biscuits (c), etc. The multiple options of the secondary feature of milk powder (a) may be brand (I), producing country (II), purpose (III), etc. Accordingly, by using the online advertisement interest form, the user is able to quickly configure the type of milk powder advertisements that the user is currently interested in. In addition, without being limited to the product category, the aforementioned advertisement body may be an emotional item. For example, the multiple options of the emotional item may be good sleep (A), exercise (B), stress relief (C), etc. The multiple options of the main feature of good sleep (A) may be mattress (a), hot cocoa (b), wine (c), etc. The multiple options of the secondary feature of mattress (a) may be brand (I), material structure (II), price (III), etc. Accordingly, by using the online advertisement interest form, the user is able to quickly configure the type of sleep-related advertisements that the user is currently interested in. In other embodiments, the online advertisement interest form may be a form with multiple fields for allowing the user to use his/her user end device 30 to fill the fields with things that the user is currently interested in. In this embodiment, through the computer processing and semantic analysis capabilities of the media system 10, it is able to configure the type of interested advertisements that the user is currently interested in.

Figure 4:
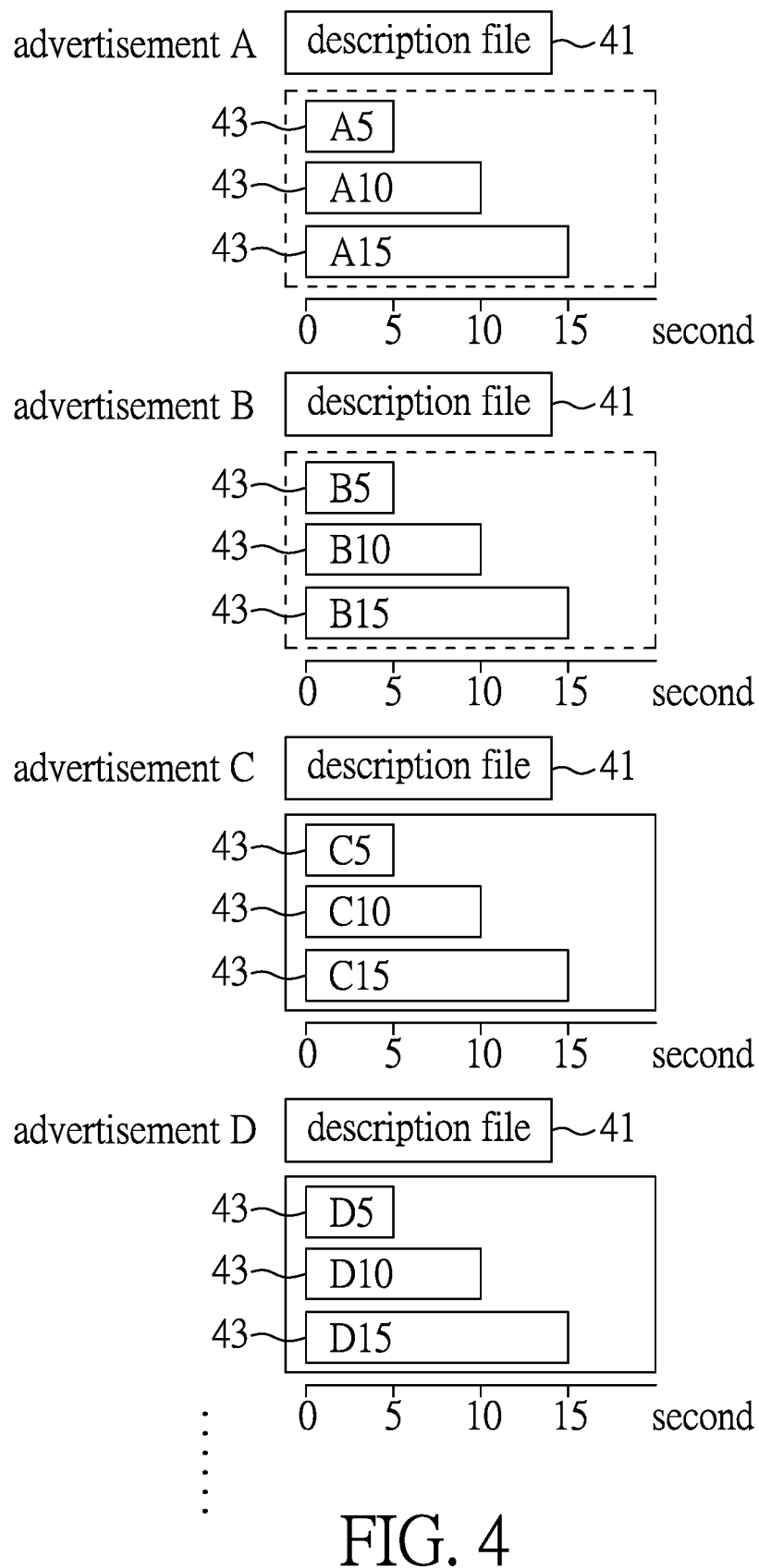
FIG. 4 schematically illustrates various advertisements provided by the advertisement system of the present invention.

Furthermore, in step S201, as shown in FIG. 4, each of the variety of advertisements provided by the advertisement system 20 according to an embodiment of the present invention has a description file 41 to describe various features of the product promoted by the advertisement, such as purpose, brand, country of production, price, etc., so that, in step S204, the media system 10 matches the description files 41 of the variety of advertisements in the advertisement system 20 with the type of interested advertisements configured in the advertisement request, so as to find a matched advertisement that conforms to the type of interested advertisements. In addition, each of the aforementioned advertisements includes a plurality of advertisement versions 43 with different lengths of time; that is, the same advertisement is made into a plurality of advertisement versions and each advertisement version is made to have a length of N time units, where N is an integer greater than 0 (for example, N=1, 2, 3, 4 and 5) and is different for different advertisement version, and a time unit is, for example, 5 seconds. With reference to the example shown in FIG. 4, advertisement A, advertisement B, advertisement C and advertisement D each include a 5-second advertisement version (respectively denoted as A5, B5, C5 and D5), a 10-second advertisement version (respectively denoted as A10, B10, C10 and D10), a 15-second advertisement version (respectively denoted as A15, B15, C15 and D15), etc.

Figure 5:
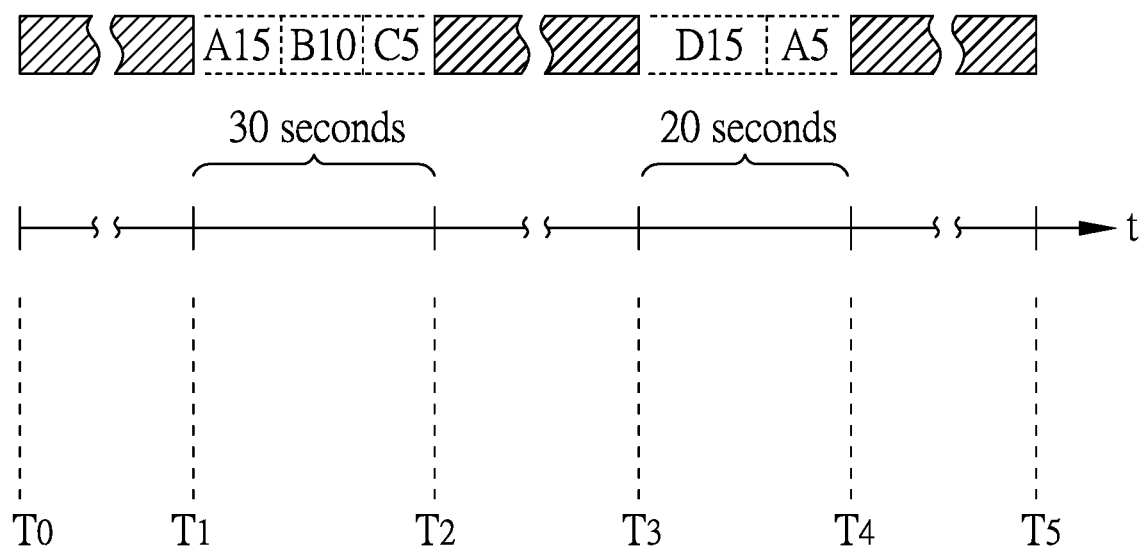
FIG. 5 schematically illustrates the media system playing program and advertisements according to the present invention.

Furthermore, as shown in FIG. 5, it shows that the specific program configured in the program request submitted by the user in step S202 for being watched or listened to has a start time T0 and an end time T5, and the specific program has a first advertisement period T1~T2 and a second advertisement period T3~T4, wherein the first advertisement period T1~T2 has a length of N (=6) time units (=6×5=30 seconds), the second advertisement period T3~T4 has a length of N (=4) time units (=4×5=20 seconds). Besides, in step S204, the matched advertisements found by the media system 10 for the specific user end device 30 include advertisement A, advertisement B, advertisement C and advertisement D. The advertisement A, advertisement B, advertisement C and advertisement D each have a 5-second advertisement version. (respectively denoted as A5, B5, C5, D5), a 10-second advertisement version (respectively denoted as A10, B10, C10, D10), a 15-second advertisement version (respectively denoted as A15, B15, C15, D15), etc. Therefore, in step S205, according to the first advertisement period T1~T2 being 30 seconds, the media system 10 combines the 15-second advertisement version A15, the 10-second advertisement version B10 and the 5-second advertisement version C5 (15 seconds+10 seconds+5 seconds=30 seconds) for being played in the first advertisement period T1~T2 and, according to the second advertisement period T3~T4 being 20 seconds, the media system 10 combines the 15-second advertisement version D15 and the 5-second advertisement version A5 (15 seconds+5 seconds=20 seconds) for being played in the second advertisement period T3~T4.

Accordingly, in step S206, when reaching the start time T0 of the specific program, the media system 10 plays the specific program on the specific user end device 30. When reaching the time T1, the media system 10 inserts and plays the advertisement version A15, the advertisement version B10 and the advertisement C5. When reaching the time T2, the advertisement playing is completed and the media system 10 continues to play the program. When reaching the time T3, the media system 10 inserts and plays the advertisement version D15 and the advertisement version A5. When reaching the time T4, the advertisement playing is completed and the media system 10 continues to play the program until the end time T5.

With the aforementioned system of the present invention, the media system 10 and the advertisement system 20 can identify a specific user and, based on the type of interested advertisements configured by the specific user and the program to be watched or listened to, insert and play the advertisements that the user is interested in when playing the program on the user end device 30 of the specific user, thereby effectively improving the effect of the advertisements.

In particular, for a minority-market product, such as fishing product, that the seller generally does not intend to advertise as there is only a few people interested in it, with the system of the present invention, it is able to ensure that the advertisements for the minority-market product can be watched by people interested in it as they can submit the type of interested advertisements that they want to watch to the media system 10, thereby greatly encouraging the seller to make advertisements for the minority-market product and further improving the effect of the advertisements. That is, in comparison with the advertisement of the popular product that is interested by a lot of people and will be played very often, resulting in paying high advertisement fee, with the present invention, it is possible that the seller may pay less money for the advertisement of the minority-market product as the advertisement will be played not often, so as to further save money for the seller in advertising and thus promote the seller to make advertisements for the minority-market product.

More particularly, in calculating the advertisement fee occurred during an advertisement period of a program, as typically there are several advertisements that may include, for example, advertisements for popular product and minority-market product, played during the advertisement, the advertisement fee that a specific seller has to pay is calculated as follows:

$$Fadv=(Ta \div T\text{total}) \times (Pa \div P\text{total}) \times Cadv,$$

where Fadv represents the advertisement fee to be paid by the specific seller, Ttotal represents the length of time of the advertisement period, Ta represents the length of time for playing the advertisement of the specific seller during the advertisement period, Ptotal represents the number of persons watching the program, Pa represents the number of persons watching the program and the advertisement of the specific seller, and Cadv represents the cost for the advertisement period of the program.

Based on the aforementioned calculation, it can be seen that the fee for advertising a minority-market product is relatively low as Pa÷Ptotal is extremely small. For example, taking the length of time of the advertisement period (Ttotal) being 3 minutes, the length of time for playing the advertisement of the specific seller during the advertisement period (Ta) being 15 seconds, the number of persons watching the program (Ptotal) being ten thousands, the number of persons watching the program and the advertisement of the specific seller (Pa) is one hundred, and the cost for the advertisement period of the program (Cadv) being two hundred thousand dollars, the advertisement fee that the specific seller has to pay is, if not considering the number of persons interested in the minority-market product, (15÷180)×200,000=16667 dollars, which is not affordable to the seller who sells the minority-market product, and is, if considering the number of persons interested in the minority-market product, (15÷180)×(100÷10,000)×200,000=167 dollars, which is surely affordable to the seller who sells the minority-market product.

Alternatively, in another embodiment of the present invention, in step S202, it may only submit an advertisement request to the media system 10 to configure the type of interested advertisements that the user is currently interested in, without submitting a program request to the media system 10 to configure the program that the user wants to watch or listen to. With such a configuring manner, similar to the previous embodiment, when the user watches or listens to the program with his/her user end device 30, the media system 10 can identify the specific user and, based on the type of interested advertisements configured by the specific user, operate with the advertisement system 20 to find the matched advertisements conforming to the type of interested advertisements in real time and combine the selected advertisement versions of all the matched advertisements for being played during the advertisement periods of the current program in watching or listening. The detailed implementation steps can be obtained by referring to the previous embodiment, and thus a detailed description therefor is deemed unnecessary.

Figure 6:
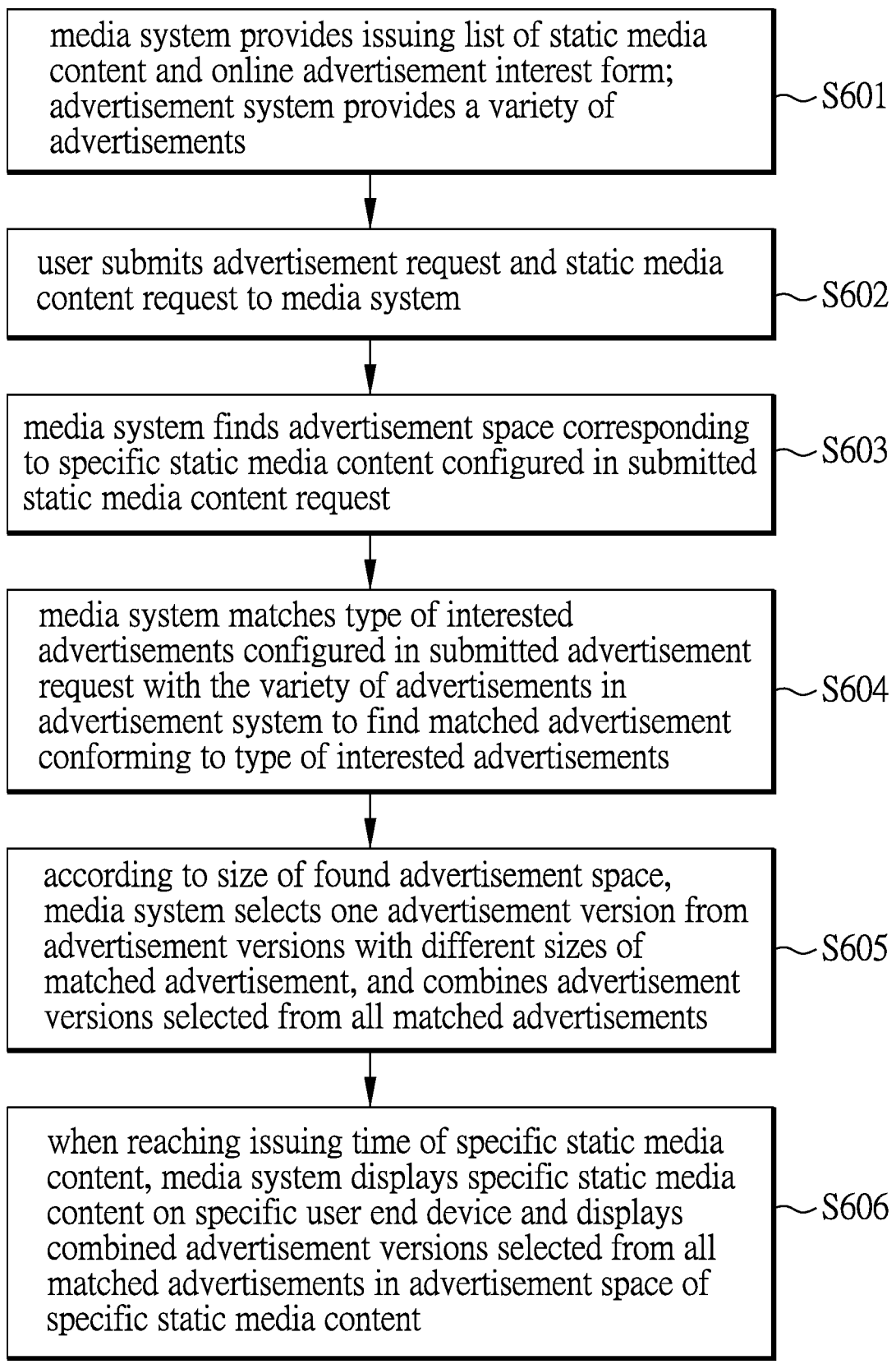
FIG. 6 shows another operation flow of the system for providing personalized advertisements based on current needs of user according to the present invention.

FIG. 6 shows another operation flow of the system for playing personalized advertisements based on current needs of user according to the present invention, which is suitable for the use environment of issuing static digital media content and advertisements such as electronic newspapers and magazines. First, in step S601, the media system 10 provides an issuing list of static media content of various digital media, and each static media content has at least one advertisement space. The advertisement space has a size of N capacity units, where N is an integer greater than 0 and one capacity unit is, for example, 5 k bytes (or pixels or other suitable units). The media system 10 further provides an online advertisement interest form for allowing the user end device 30 to submit an advertisement request. The advertisement system 20 provides a variety of advertisements, and each advertisement includes a plurality of advertisement versions with different sizes. The aforementioned online advertisement interest form is similar to that of the previous embodiment and thus a detailed description is deemed unnecessary. The variety of advertisements provided by the aforementioned advertisement system 20 are also similar to those of the previous embodiment except for each advertisement including a plurality of advertisement versions with different sizes. For example, the same advertisement is made into a plurality of advertisement versions and each advertisement version is made to have a size of N capacity units, where N is an integer greater than 0 (for example, N=1, 2, 3, 4, and 5) and a capacity unit is, for example, 5 k bytes (or pixels or other suitable units).

Then, in step S602, the user uses his/her user end device 30 to submit an advertisement request to the media system 10 by filling out an online advertisement interest form, so as to configure at least one type of interested advertisements that the user is currently interested in. According to the issuing list of various static media contents provided by the media system 10, the user may use his/her user end device 30 to submit a static media content request to the media system 10 so as to configure at least one specific static media content that the user wants to watch.

Next, in step S603, according to at least one specific static media content configured in the static media content request submitted by the specific user end device 30, the media system 10 finds at least one advertisement space corresponding to the specific static media content, and the at least one advertisement space is the space in which the advertisement is placed when displaying the specific static media content.

Next, in step S604, the media system 10 matches the at least one type of interested advertisements configured in the advertisement request submitted by the specific user end device 30 with the variety of advertisements provided in the advertisement system 20, so as to find at least one matched advertisement that conforms to the type of interested advertisement.

Next, in step S605, according to the size of the at least one advertisement space found in step S603, the media system 10 selects an advertisement version from the advertisement versions with different sizes of the at least one matched advertisement found in step S604, and combines the advertisement versions selected from all the matched advertisements, wherein the size for the combined advertisement versions selected from all the matched advertisements is equal to the size of the aforementioned advertisement space.

Finally, in step S606, when reaching the issuing time of the at least one specific static media content, the media system 10 displays the specific static media content on the specific user end device 30, and displays the combined advertisement versions selected from all the matched advertisements in the advertisement space of the specific static media content.

Figure 7:
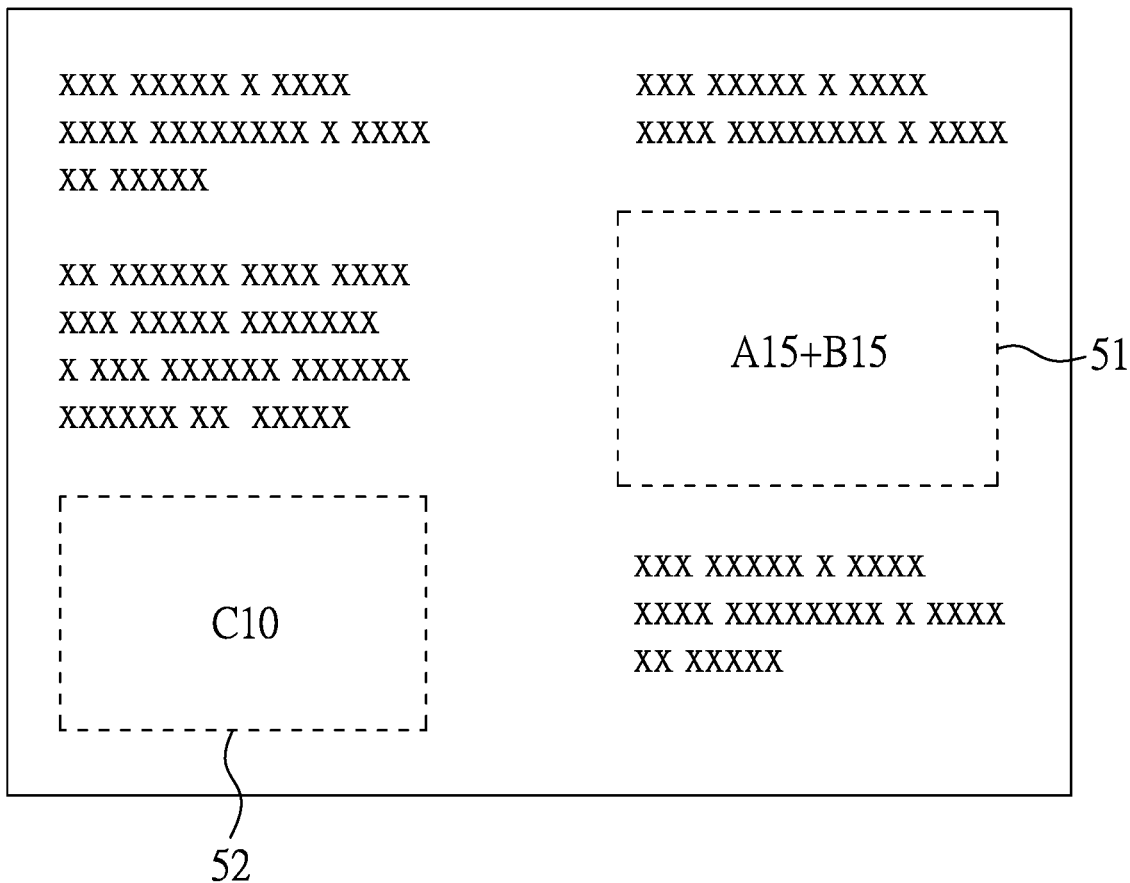
FIG. 7 schematically illustrates the media system displaying static media content and advertisements according to the present invention.

Furthermore, as shown in FIG. 7, it shows that the specific static media content configured in the static media content request submitted by the user in step S602 for being watched has a first advertisement space 51 and a second advertisement space 52, wherein the first advertisement space 51 has a size of N (=6) capacity units (=6×5 k=30 k bytes), and the second advertisement space 52 has a size of N (=2) capacity units (=2×5 k=10 k bytes). Besides, in step S604, the matched advertisements found by the media system 10 for the specific user end device 30 include advertisement A, advertisement B and advertisement C. The advertisement A, advertisement B and advertisement C each have a 5 k-byte advertisement version (respectively denoted as A5, B5, C5, D5), a 10 k-byte advertisement version (respectively denoted as A10, B10, C10, D10), a 15 k-byte advertisement version (respectively denoted as A15, B15, C15, D15), etc. Therefore, in step S605, according to the first advertisement space 51 being 30 k bytes, the media system 10 combines the 15 k-byte advertisement version A15 and the 15 k-byte advertisement version B15 (15 k+15 k=30 k) for being placed in the first advertisement space 51 and, according to the second advertisement space 52 being 10 k bytes, the media system 10 places the 10 k-byte advertisement version C10 in the second advertisement space 52. Accordingly, in step S606, when the specific static media content is issued, the media system 10 displays the specific static media content on the specific user end device 30, and respectively displays the combined advertisement versions (A15+B15) and the advertisement version C10 placed in the advertisement space 51 and the advertisement space 52 of the specific static media content.

Alternatively, in another embodiment of the present invention, in step S602, it may only submit an advertisement request to the media system 10 to configure the type of interested advertisements that the user is currently interested in, without submitting a static media content request to the media system 10 to configure the static media content that the user wants to watch. With such a configuring manner, similar to the previous embodiment, when the user watches a static media content with his/her user end device 30, the media system 10 can identify the specific user and, based on the type of interested advertisements configured by the specific user, operate with the advertisement system 20 to find the matched advertisements conforming to the type of interested advertisements in real time and combine the selected advertisement versions of all the matched advertisements for being displayed in the advertisement spaces of the current static media content in watching. The detailed implementation steps can be obtained by referring to the previous embodiment, and thus a detailed description therefor is deemed unnecessary.

The aforementioned embodiments are examples only for convenience of description, the scope of the present disclosure is claimed hereinafter in the claims and is not limited to the embodiments.

What is claimed is:

1. A system for providing personalized advertisements based on current needs of user, comprising:
   a media system for providing a playing schedule for programs of digital media, each program having at least one advertisement period, wherein the programs of digital media are programs of TV played through public broadcasting;
   an advertisement system coupled to the media system for providing a variety of advertisements, each advertisement including a plurality of advertisement versions with different lengths of time; and
   a plurality of user end devices connected to the media system and the advertisement system via packet transmission, each user end device having a unique identification code with which the media system and the advertisement system identify a specific user end device,
   wherein a specific user end device submits an advertisement request to the media system by using an online advertisement interest form, and further submits a program request to the media system; the media system finds at least one advertisement period corresponding to a specific program configured in the program request submitted; the media system matches the at least one type of interested advertisements of the specific user end device configured in the submitted advertisement request with the variety of advertisements provided in the advertisement system, so as to find at least one matched advertisement that conforms to the type of interested advertisements of the specific user end device; according to the length of the at least one advertisement period found and the at least one matched advertisement found to be representative of current needs of user, the media system selects at least one advertisement version from the plurality of advertisement versions with different lengths of time of the at least one matched advertisement, and combines the advertisement versions selected from all the matched advertisements, whereby, when reaching playing time of the specific program, the media system plays the specific program on the specific user end device, and plays the combined advertisement versions selected from all the matched advertisements are played during at least one advertisement period of the specific program.

2. The system as claimed in claim 1, wherein the advertisement period of the specific program has a length of N time units, where N is an integer greater than 0, and a length of time for playing the combined advertisement versions selected from all the matched advertisements is equal to the length of the advertisement period.

3. The system as claimed in claim 1, wherein the advertisement interest form is a form with a multi-level menu or a form with multiple fields for configuring the type of interested advertisements.

4. The system as claimed in claim 2, wherein each of the variety of advertisements has a description file to describe features of a product promoted by the advertisement.

5. The system as claimed in claim 4, wherein the media system matches the type of interested advertisements configured in the advertisement request with the description files of the variety of advertisements in the advertisement system so as to find the matched advertisement that conforms to the type of interested advertisements.

6. The system as claimed in claim 2, wherein each of the plurality of advertisement versions is made to have a length of N time units, where N is an integer greater than 0 and N is different for different advertisement version.

7. A system for providing personalized advertisements based on current needs of a user, comprising:
   a media system for providing an issuing list for static media contents of digital media, each static media content having at least one advertisement space, wherein the digital media are digital newspapers or magazines;
   an advertisement system coupled to the media system for providing a variety of advertisements, each advertisement including a plurality of advertisement versions with different sizes; and
   a plurality of user end devices connected to the media system and the advertisement system via packet transmission, each user end device having a unique identification code with which the media system and the advertisement system identify a specific user end device,
   wherein a specific user end device submits an advertisement request to the media system by using an online advertisement interest form, and further submits a static media content request to the media system; the media system finds at least one advertisement space corresponding to a specific static media content configured in the static media content request submitted; the media system matches the at least one type of interested advertisements of the specific user end device configured in the submitted advertisement request with the variety of advertisements provided in the advertisement system, so as to find at least one matched advertisement that conforms to the type of interested advertisements of the specific user end device; according to the size of the at least one advertisement space found and the at least one matched advertisement found to be representative of current needs of user, the media system selects at least one advertisement version from the plurality of advertisement versions with different sizes of the at least one matched advertisement, and combines the advertisement versions selected from all the matched advertisements, whereby, when reaching issuing time of the specific media content, the media system issues the specific static media content to the specific user end device, and arranges the combined advertisement versions selected from all the matched advertisements in the at least one advertisement space of the specific static media content.

8. The system as claimed in claim 7, wherein the advertisement space of the specific static media content has a size of N capacity units, where N is an integer greater than 0, and a size of capacity for accommodating the combined advertisement versions selected from all the matched advertisements is equal to the size of the advertisement space.

9. The system as claimed in claim 7, wherein the advertisement interest form is a form with a multi-level menu or a form with multiple fields for configuring the type of interested advertisements.

10. The system as claimed in claim 8, wherein each of the variety of advertisements has a description file to describe features of a product promoted by the advertisement.

11. The system as claimed in claim 10, wherein the media system matches the type of interested advertisements configured in the advertisement request with the description files of the variety of advertisements in the advertisement system so as to find the matched advertisement that conforms to the type of interested advertisements.

12. The system as claimed in claim 8, wherein each of the plurality of advertisement versions is made to have a size of N capacity units, where N is an integer greater than 0 and N is different for different advertisement version.

* * * * *